Nov. 16, 1965 B. F. WILEY 3,218,398

MAGNETIC TAPE RECORDING

Filed May 18, 1961

INVENTOR.
B. F. WILEY

BY Hudson + Young

ATTORNEYS

United States Patent Office 3,218,398
Patented Nov. 16, 1965

3,218,398
MAGNETIC TAPE RECORDING

Bruce F. Wiley, Bartlesville, Okla., assignor to Phillips Petroleum Company, a corporation of Delaware
Filed May 18, 1961, Ser. No. 111,049
5 Claims. (Cl. 179—100.2)

This invention relates to an improved method of and apparatus for magnetic tape recording. In one specific aspect, this invention relates to an improved method of and apparatus for recording on a magnetic tape whereby a portion of a pre-recorded signal is erased.

A conventional recording technique in wide use is known as carrier erase recording. This type of recording is particularly adaptable to the miniature tape recorders. Briefly, this recording technique is accomplished by pre-recording a carrier frequency in a sine-wave fashion on a tape coated with a layer of suitable magnetic recording material. The carrier frequency is normally applied in sufficient amplitude to saturate the recording medium. A data signal is then applied to the pre-recorded carrier in the manner so as to erase a portion of the pre-recorded carrier. With the data recorded, the tape is played back with the data being amplified, rectified, and the carrier filtered out. The result is the desired data.

In a conventional erase recording head, a data signal is supplied as varying D.C. current to a coil wound on the head. As the erase curve for the carrier is not completely linear, a second winding on the head supplies a D.C. bias current which sets the point of operation within the linear portion of the erase curve. A disadvantage of the erase carrier system is that said system is dependent on electrical circuitry which often must include some form of mechanical to electrical transducer.

Another type of recording head employed is a permanent magnetic recording head. This type of recording procedure consists of moving a permanent magnet towards and away from a moving magnetic tape having a pre-recorded signal in response to a data sensing means. A disadvantage of this method of recording is that the entire mass of the permanent magnetic head must be moved, requiring a relatively large amount of energy. With the receipt of large signals, the permanent magnet may be moved excessive distances resulting in inaccurate recording. Further, vibrations of the moving magnetic tape will result in inaccurate recording.

Accordingly, an object of this invention is to provide an improved method of and apparatus for magnetic tape recording.

Another object of this invention is to provide an improved method of and apparatus for recording on a magnetic tape whereby a portion of a pre-recorded signal is erased.

Other objects, advantages and features of my invention will be readily apparent to those skilled in the art from the following description and appended claims.

I have discovered that data can be recorded on a moving pre-recorded magnetic tape by placing the recording head in fixed relationship to said moving tape. Flux modulation in the head gap exposed to said moving magnetic tape is attained by mechanically varying the reluctance of a magnetic circuit in response to a displacement signal or data sensing means. This source of flux for the recording head is a permanent magnet.

Conventional magnetic tapes can be employed in the practice of this invention. The tape is coated with a layer of suitable magnetic recording material, for example, finely divided magnetite and a binder. A pre-recorded carrier signal can be recorded on the magnetic tape by, for example, passing said magnetic tape at constant speed through a magnetic field varying in direction and strength with constant frequency and amplitude. Standard means well known in the art can be utilized to apply the varying carrier signal to the recording medium in this manner. An example of this is the passage of the magnetic tape past a reluctant gap in a ring electromagnet, the coil of which is connected into the output circuit of an oscillator.

Figure 1:
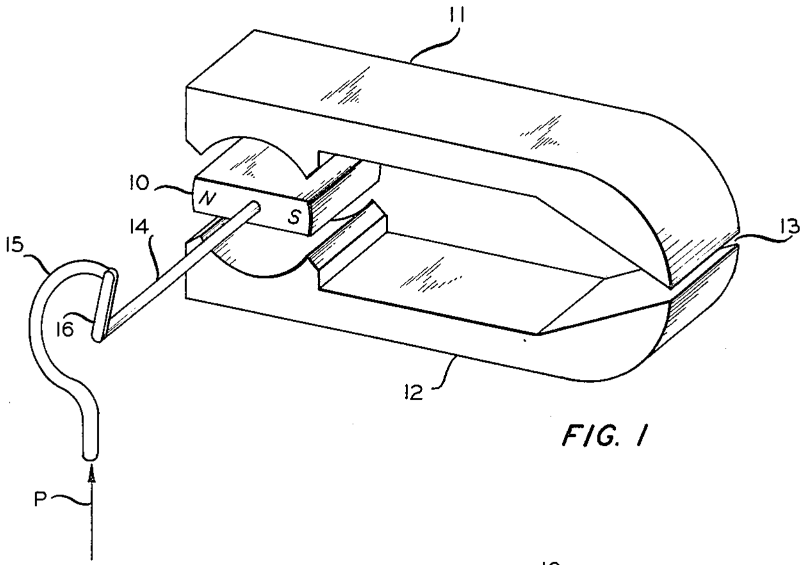
FIGURE 1 is illustrative of one embodiment of the inventive recording head.

Referring to FIGURE 1, there is shown a head comprised of a small permanent magnet armature 10 and pole pieces 11 and 12. Pole pieces 11 and 12 are fabricated from a material, such as soft iron, capable of conducting magnetic lines of force and having a low hysteresis. The recording head has a gap 13 between pole pieces 11 and 12 to provide a magnetic field. Although an air gap is herein illustrated, it is within the scope of this invention to fill the gap with non-magnetic force conductive material, such as copper or brass. The width of the gap is in the approximate range of 1–5 thousandths of an inch. With the armature 10 in the neutral position illustrated in FIGURE 1, the magnetic circuit is balanced and, therefore, there will be no flux across gap 13. With the rotation of the armature 10 from its neutral position, the distance between each of the north and south poles of armature 10 and the nearest pole piece should not in any position exceed ½ the length of the magnet armature 10. A gap is maintained between rotating armature 10 and each of the pole pieces 11 and 12 throughout the recording range, with a maximum rotation or recording range of 180°. Magnet armature 10 is spaced from gap 13 so that the direct magnetic field of magnet armature 10 will not interfere with the magnetic field about gap 13.

A rotatable shaft 14 provides a means of rotating magnet armature 10, thus varying the reluctance of the magnetic circuit. A rotating motion is indirectly imparted to shaft 14 by a pressure P applied to Bourdon tube 15. A linking member 16 provides a means for directly imparting a rotation to shaft 14 in response to a pressure change in Bourdon tube 15. It is within the scope of this invention to provide other means of imparting a rotation to magnet armature 10 to vary the reluctance of the magnetic circuit in response to a displacement signal or data sensing means. For example, in the case of pressure recording the displacement signal or force can be supplied by a diaphragm; for temperature recording, an expansion rod or a bi-metallic element can be employed; for strain recording, the deflection of the beam or other elastic member can be utilized. It is also within the scope of this invention to employ the inventive recording head in the recording of an electrical displacement signal wherein some form of an electrical to mechanical transducer is utilized to convert the electrical displacement signal to a mechanical force.

Figure 2:
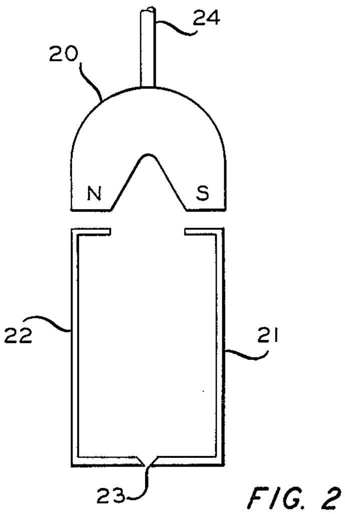
FIGURE 2 is illustrative of another embodiment of the inventive recording head.

Referring to FIGURE 2, there is illustrated another form of the inventive magnetic recording head. A magnet armature 20 is rotated by means of a shaft 24. Poles pieces 21 and 22 having a gap 23 are spaced within the direct magnetic field of magnet armature 20 and apart from said magnet armature 20. It is within the scope of this invention to employ other recording heads than the inventive recording heads herein illustrated. Although rotating magnet armatures are illustrated in FIGURES 1 and 2, it is within the scope of this invention to otherwise move armature 10 with respect to pole pieces 11 and 12, such as moving armature 10 laterally with respect to and between pole pieces 11 and 12 to thus vary the reluctance of the magnetic circuit.

Figure 3:
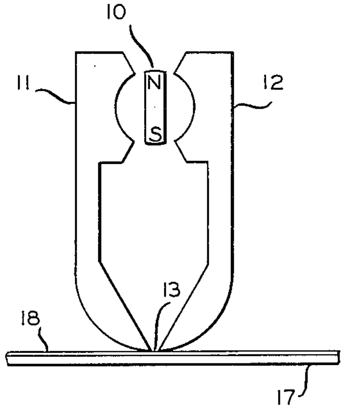
FIGURE 3 is illustrative of the inventive method of recording on a magnetic tape.

Referring to FIGURE 3, a method of employing the inventive recording head is illustrated. A tape 17 coated with a magnetic recording medium 18 and with a pre-recorded signal inscribed thereon, is moved in direct contact with pole pieces 11 and 12 across gap 13. When the magnet armature 10 is in a neutral position as illustrated, the magnetic circuit is balanced and there will be no flux across gap 13. If the armature is rotated slightly about its axis, a magnetic field will appear and partially erase the carrier flux on the moving tape 17. The strength and direction of this erasing field will depend upon the amount and direction of rotation. The maximum amount of rotation will not exceed 180°, or up to the limit of linearity of the system. With this action, it is possible to amplitude modulate the pre-recorded carrier on the tape by means of a mechanical force signal applied to the rotating armature. Bias for the recording process can be obtained by pre-positioning the armature or by using fixed magnets. The armature position-erasing flux relationship can be varied by the use of special pole shapes whereby the gap between the rotating armature and the pole pieces is variable or by shunts in the direct magnetic field. By these means the linearity of the recording characteristics can be modified or improved.

Although the moving magnetic tape has been illustrated in the preferred embodiment of moving across gap 13 in direct contact with pole pieces 11 and 12, it is also within the scope of this invention to space tape 17 apart from said pole pieces 11 and 12, continuing to hold the recording head in a permanent fixed position relative to moving tape 17.

The recording medium, after passage by the recording head, is left in a state of magnetization varying along its length in accordance with the rotation of the magnet armature relative to the medium. The resultant record can then be read by means of a standard magnetic recording reproducer, and the voltage output of the reproducer, being proportional to the rate of change of induction in the reproducing head, will correspond to the first time-derivative of the original recorded displacement signal. In order to recover a signal proportional to the original recorded displacement signal, the reproduced signal can be integrated against time. Electronic methods for accomplishing this integration are well known.

The inventive recording head and method of erase recording is particularly adaptable to the recording of mechanical displacement signals, but not necessarily limited thereto. By holding the recording head in fixed relationship to the moving magnetic tape, larger displacement signals can be recorded with greater accuracy than heretofore available with the prior art methods. Where the tape is in constant sliding contact with the pole pieces, recording errors due to tape vibration are eliminated. With the necessity of only moving a relatively small magnet armature, a minimum of power is required in the erase recording of a displacement signal.

Although the invention has been illustrated using a tape having a magnetic coating, it is within the scope of this invention to employ conventional magnetic recording tapes such as an iron wire.

As will be evident to those skilled in the art, various modifications of this invention can be made, or followed, in the light of the foregoing disclosure and discussion without departing from the spirit and scope thereof.

I claim:

1. Apparatus comprising, in combination, a magnet armature, means for rotating said magnet armature up to 180° about a center axis, a pair of spaced parallel pole pieces with one end of said spaced parallel pole pieces positioned in the proximity of said rotating magnet armature, and a magnetic tape adapted to move within and in fixed relationship to a produced magnetic field at the opposite end of said pole pieces, said tape containing a pre-recorded carrier signal.

2. The apparatus of claim 1 wherein said magnetic tape is adapted to move in constant sliding contact with the opposite end of said pair of spaced pole pieces.

3. Apparatus comprising, in combination, a data sensing means, a magnet armature, means for rotating said magnet armature up to 180° about a center axis in response to said sensing means, a pair of spaced parallel pole pieces with one end of said parallel pole pieces positioned in the proximity of said rotating magnet armature, and a magnetic tape adapted to move within and in fixed relationship to a produced magnetic field at the opposite end of said pole pieces, said moving tape containing a pre-recorded carrier signal.

4. The apparatus of claim 3 wherein said magnetic tape is adapted to move in constant sliding contact with the opposite end of said pair of spaced pole pieces.

5. Apparatus comprising, in combination, a permanent magnet having a south pole end and a north pole end, a pair of spaced pole pieces with one end of said parallel pole pieces positioned in the proximity of said permanent magnet, means for moving said permanent magnet between said parallel pole pieces, and a magnetic tape adapted to move within and in fixed relationship to a magnetic field at the opposite end of said parallel pole pieces, said magnetic tape containing a pre-recorded carrier signal.

References Cited by the Examiner

UNITED STATES PATENTS

| | | | |
|---|---|---|---|
| 2,558,187 | 6/1951 | Marrison | 346—74 |
| 2,560,474 | 7/1951 | Potts | 346—74 |
| 2,777,698 | 1/1957 | Kurzeder | 179—100.2 |
| 3,013,124 | 12/1961 | Epstein | 179—100.2 |

OTHER REFERENCES

Gomer L. Davies: "Magnetic Tape Instrumentation," McGraw-Hill Book Company, Inc., copyright 1961, TK 7872 D3D3, p. 74 (description on p. 63—footnote on p. 74 gives date as 1951).

IRVING L. SRAGOW, *Primary Examiner.*

DAVID G. REDINBAUGH, *Examiner.*